United States Patent [19]

Taipale

[11] Patent Number: 4,937,927
[45] Date of Patent: Jul. 3, 1990

[54] METHOD OF JOINING A SLEEVE INTO A CYLINDER OPENING OF A RECIPROCATING PISTON

[75] Inventor: Dale L. Taipale, Delafield, Wis.

[73] Assignee: Slinger Manufacturing Company, Inc., Slinger, Wis.

[21] Appl. No.: 290,214

[22] Filed: Dec. 27, 1988

Related U.S. Application Data

[62] Division of Ser. No. 924,965, Oct. 30, 1986, abandoned.

[51] Int. Cl.$^5$ .......................... B23P 15/10; B23Q 3/14
[52] U.S. Cl. ................................... 29/888.061; 29/464
[58] Field of Search ............... 29/156.4 WL, 149.5 R, 29/149.5 C, 464; 92/169, 171; 123/193 C, 41.83

[56] References Cited

U.S. PATENT DOCUMENTS

| | | | |
|---|---|---|---|
| 1,437,904 | 12/1922 | Moomaw | 123/193 C |
| 1,896,098 | 2/1933 | Poyer | 123/193 C |
| 2,311,329 | 2/1943 | Caminez | 123/193 C |
| 4,153,983 | 5/1979 | Stockton | 29/156.4 WL |

FOREIGN PATENT DOCUMENTS 15741  1/1983  Japan .............................. 123/193 C

*Primary Examiner*—Timothy V. Eley
*Assistant Examiner*—Peter D. B. Vo
*Attorney, Agent, or Firm*—Quarles & Brady

[57] ABSTRACT

A cast iron sleeve liner for an internal combustion engine cylinder, or other reciprocating piston apparatus, is provided with external screw threads on its outer diameter along substantially its entire length. The screw threads engage complementary internal screw threads that are formed in a cylinder opening. One end of the sleeve abuts against a shoulder in the cylinder as the sleeve is threaded into the cylinder to force the cooperating threads into contact to take up the backlash, or clearance, between the threads. The clearance between the threads may be filled with a sealant. The sleeve can be produced wholly apart from the cylinder by first forming a raw cylindrical casting, then forming the exterior screw threads, and then machining the cylinder bore in the sleeve while the sleeve is held in a fixture which simulates the cylinder opening.

3 Claims, 1 Drawing Sheet

U.S. Patent
Jul. 3, 1990
4,937,927
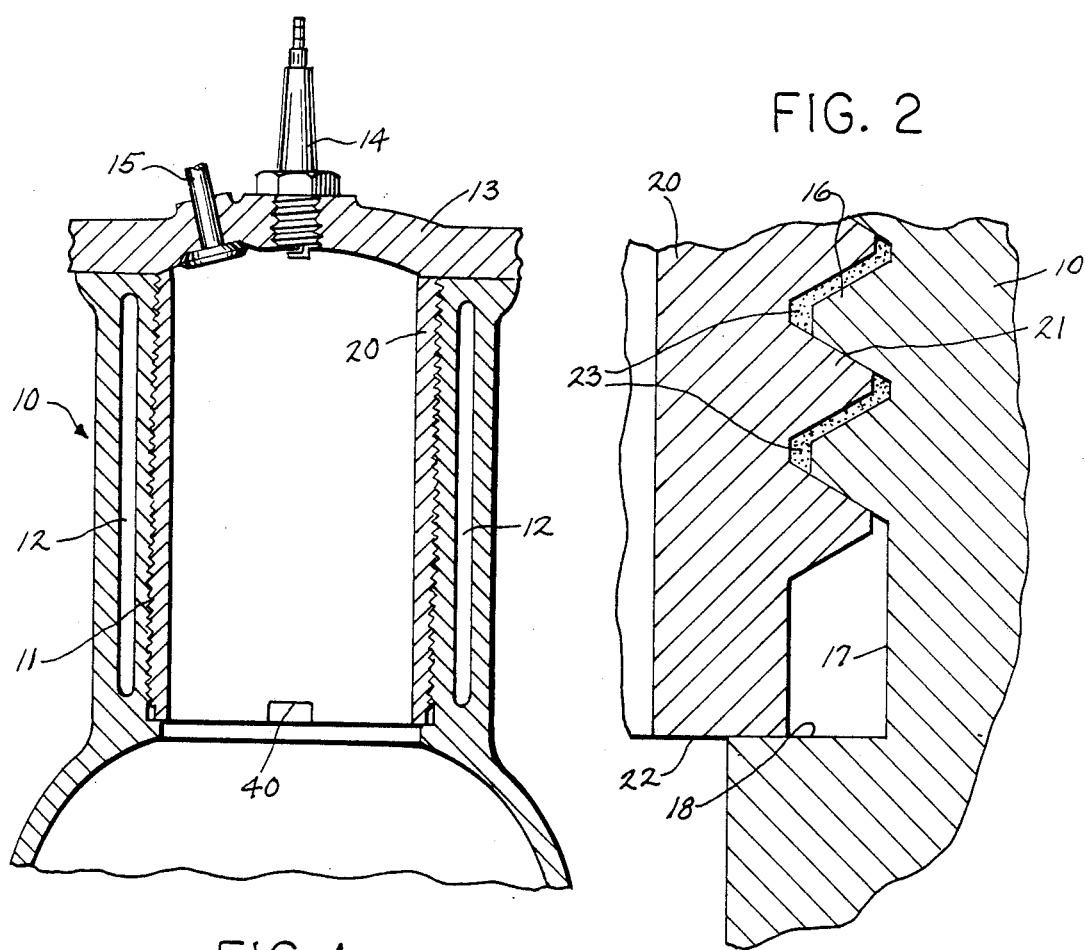
FIG. 1
FIG. 2
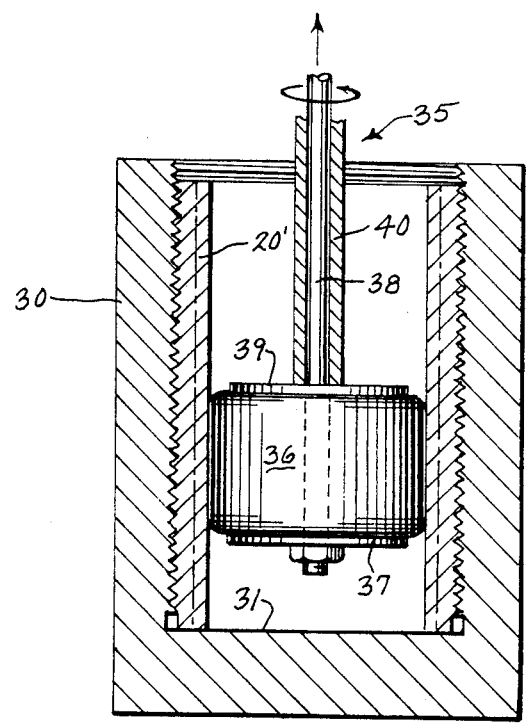
FIG. 3

METHOD OF JOINING A SLEEVE INTO A CYLINDER OPENING OF A RECIPROCATING PISTON

This is a division, of application Ser. No. 24,965, filed Oct. 30, 1986 now abandoned.

BACKGROUND OF THE INVENTION

This invention relates to sleeve inserts for the cylinders of a reciprocating piston apparatus, and particularly to the manner of joining a sleeve insert to the cylinder.

The trend in the development of internal combustion engines is to reduce the weight of the engine by using aluminum or aluminum alloys instead of the traditional cast iron for the cylinder block and other major engine components. The use of aluminum makes it necessary to provide a wear surface for the cylinder bore of some other harder material since most aluminum is too soft to withstand the abrasion that will be encountered as the piston works in the cylinder. The harder surface for the cylinder is typically provided by a thin wall cast iron sleeve insert for the cylinder.

The cast iron sleeves have been mounted within the cylinders by several techniques. One approach uses a sleeve formed with an external pattern of protrusions or ribs. The preformed sleeve is placed into the mold for casting of the cylinder about the sleeve. A second approach has been to shrink fit the sleeve into the cylinder. Both approaches achieve less than satisfactory results primarily because they require the application of heat to one or both of the sleeve and cylinder during the assembly. The heating of the components and the insertion of the sleeve greatly increasing the production time. More importantly, upon cooling the cylinder bore becomes distorted because of uneven expansion or contraction in the thin wall sleeve. If such distortion is sought to be eliminated by reboring the sleeve following its assembly into the cylinder, uneven wall thicknesses for the sleeve will result. The heat transfer from the sleeve to the cylinder during operation then becomes non-uniform and localized and results in different, unacceptable distortions to the cylinder bore.

The normal machining operations required on a thin wall sleeve can also distort the sleeve even if the sleeve is not subjected to differential heating or cooling. The gripping of the sleeve during machining and the normal tool forces can result in unacceptable distortions.

Although these problems involving the use of sleeve inserts are particularly acute in the manufacture of internal combustion engines, similar problems are also present in connection with sleeve inserts for other reciprocating piston equipment, such as air compressors.

The present invention is directed to the manner of mounting a sleeve insert in a cylinder which does not require the application of heat or cooling during the assembly process, which allows the complete production of the sleeve prior to its assembly in the cylinder without distortion, and which allows the sleeve to be assembled or disassembled from the cylinder at room temperature using simple tools.

SUMMARY OF THE INVENTION

In accordance with the invention, a cylinder sleeve has an external screw thread along a major portion of its length, and preferably along substantially its entire length. The cylinder opening into which the sleeve is inserted has a complementary internal screw thread over a portion of its length substantially coextensive with the sleeve.

The invention resides in the method of making and assembling a cylinder and sleeve, in the cylinder and sleeve combination, and in the sleeve itself, including the method of manufacturing the sleeve.

In the preferred embodiment, the sleeve is provided with a standard external screw thread along its entire length. A complementary internal screw thread is provided on the inside diameter of the cylinder opening. An axial abutment is formed between the cylinder and sleeve so that, when the sleeve is screwed into the cylinder, the axial abutment will resist further penetration of the sleeve and force the taking up of the clearance, or backlash, between the screw threads of the sleeve and of the cylinder. In this way, continuous metal-to-metal contact between the sleeve and cylinder is insured.

The internal screw threads of the cylinder can be machined as one of the steps of the manufacture of the cylinder or cylinder block. If more than one cylinder is formed in a block, the threads can be formed in the cylinder openings of all cylinders at one time so as to preserve and insure center spacing between the cylinders and parallelism of the axes of the cylinders.

The sleeve is preferably completely manufactured before its insertion into the cylinder. The manufacture begins by the production of a raw cylindrical casting which may have a substantial wall thickness. The external screw threads may then be formed on the raw casting and the sleeve is thereafter threaded into a heavy fixture which duplicates the opening in the cylinder in which the sleeve will be used. The heavy fixture supports the sleeve while the inner cylinder bore of the sleeve is machined. The machining produces the desired thin wall sleeve. The completed sleeve is removed from the fixture and is ready for assembly to a cylinder.

It is a principal object of the invention to provide a manner of mounting a sleeve defining a cylinder bore into a cylinder opening which does not distort the sleeve or its cylinder bore.

It is another object of the invention to provide a manner of mounting of a sleeve which does not require the application of differential heating or cooling to the sleeve or cylinder.

It is yet another object of the invention to provide a manner of mounting a very thin sleeve in a cylinder which permits the complete manufacture of the sleeve prior to its assembly into the cylinder.

It is a further object of the invention to provide a sleeve for an engine cylinder that is removable and replaceable.

The foregoing and other objects and advantages of the invention will appear in the following detailed description. In the description reference is made to the accompanying drawing which shows a preferred embodiment of the invention.

BRIEF DESCRIPTION OF THE DRAWING

FIG. 1 is a view in vertical section through a cylinder assembly including a sleeve insert;

FIG. 2 is an enlarged view in vertical section of a portion of the sleeve and cylinder of FIG. 1 illustrating the complementary screw threads and the axial abutment between the sleeve and cylinder; and FIG. 3 is a view in vertical section of a heavy fixture with a partially machined sleeve in place, and further illustrating a tool for inserting and removing the sleeve.

DETAILED DESCRIPTION OF THE PREFERRED EMBODIMENT

Referring to FIG. 1, an engine cylinder 10 is illustrated having a cylinder opening 11 surrounded by passages 12 for the flow of a coolant. The cylinder opening 11 is closed by a cylinder head 13 which mounts a spark plug 14 and valves of which the valve 15 is representative. The representation of the cylinder 10 is stylized and is not meant to be representative of any particular form or design of engine cylinder, since the cylinder itself forms no part of the invention.

The cylinder opening is provided with an internal screw thread 16 along its entire length save for a short cylindrical portion 17 at the base of the cylinder 10 and adjacent a shoulder abutment 18.

A relatively thin wall cast iron sleeve 20 is mounted within the cylinder opening 11. The sleeve 20 has an external screw thread 21 formed on its outer diameter that is complementary with the internal screw thread 16 of the cylinder. The external screw thread 21 is formed along substantially the entire length of the sleeve 20. As shown in FIG. 1, one end 22 of the sleeve 20 is adapted to seat against the shoulder 18 in the cylinder when the sleeve has been fully inserted into the cylinder opening 11. When the sleeve end 22 encounters the shoulder 18, the clearance between the screw threads 16 and 21, commonly called backlash, will be taken up and there will be metal-to-metal contact between the mating screw threads. This condition is illustrated in FIG. 2. The metal-to-metal contact along essentially the full length of the sleeve 20 is important to provide the heat transfer from the sleeve to the cylinder and then to the coolant (whether liquid or air).

For sake of economy, the screw threads 16 and 21 of the cylinder and sleeve can be of a standard configuration, such as the Unified Thread Standard. This allows the use of standard tooling for producing the screw threads. The screw threads should also be selected to allow adequate clearance during assembly, so that no difficulty can be encountered in threading the sleeve into the cylinder. Threads with significant clearance also do not require that fine tolerances be maintained. An example of a useful thread configuration is the 16 Thread Series of the Unified Thread Standard, which is an extra-fine-thread series for diameters larger than two inches. That is the configuration shown in FIG. 2. Within that Series, Class 2A external threads and Class 2B internal threads will provide sufficient clearance for ease of assembly. If there is concern for the possibility that lubricants or gases will migrate along the engaged screw threads, the spaces between adjacent threads can be filled with a sealant 23 that is applied prior to assembly.

The threads on the interior of the cylinder 10 may be applied during the normal machining operation of the cylinder. In manufacturing the sleeve, the sleeve is first cast with a heavier wall thickness than is to be provided after machining so that the casting can be accomplished with ease. The screw threads 21 on the exterior of the sleeve 20 are then machined into the raw casting. The partially completed sleeve is then inserted into a heavy fixture 30, such as shown in FIG. 3, which simulates and corresponds to the threaded opening in the cylinder in which the sleeve will be mounted. The fixture 30 also includes a bottom surface 31 which corresponds to the shoulder 18 in the cylinder 10. When a partially completed sleeve 20' is inserted in the fixture 30, its wall thickness is greater than its finished thickness and the fixture 30 is employed to hold and support the sleeve 20' while its inner bore, which will define the cylinder bore, is machined. FIG. 3 shows a partially completed sleeve 20' whose final wall thickness after machining is illustrated by phantom lines.

The sleeve 20' is supported in the fixture 30 along the entire length of the sleeve and about its entire circumference by reason of the engaging screw threads. This eliminates the localized forces that would result from gripping devices to hold the sleeve during machining. The complete support also minimizes any distortion resulting from the normal tool forces encountered in machining.

FIG. 3 also illustrates a tool for inserting and removing in-process or completed sleeves from the fixture 30 and from a cylinder 10. The tool 35 consists of a simple, expandable rubber element 36. The rubber element 36 is held between bottom plate 37 connected to a through rod 38 and an upper plate 39 attached to a hollow quill 40 surrounding the through rod 38. Raising the through rod 38 within the quill 40 will move the plates 37 and 39 toward each other and will squeeze the rubber element 36 to cause it to expand outwardly to grip the sleeve 20'. The tool 35 may then be rotated to insert or remove the sleeve.

Other arrangements can be provided for facilitating the insertion and removal of the sleeves from the cylinders or fixtures. For example, the base of the sleeve may be provided with notches, such as the notch 40 illustrated in FIG. 1, which are engaged by a tool to permit rotation of the sleeve. The precise tool used to facilitate the threading of the sleeve into the cylinder is not important. What is significant is the ability which the present invention affords to allow assembly of the fully completed sleeve to the cylinder at room temperature and by the use of simple tools. The invention also allows removal of the sleeves at room temperature and with simple tools thereby opening up the possibility that cast iron cylinder sleeves can be replaced in the field as part of the servicing of engines.

The necessary axial force to take up the backlash between the threads can be provided by a number of arrangements. For example, the sleeve may have an integral collar which abuts against an end of the cylinder adjacent the opening, or a separate lock nut could be threaded into the cylinder opening at one end to provide the axial abutment for the sleeve.

It is important to have metal-to-metal contact between the sleeve and cylinder over a major portion of the coextensive lengths of the sleeve and cylinder opening so that maximum heat transfer is achieved and the heat transfer is uniform. The screw threads are preferably provided over substantially the entire coextensive lengths of the cylinder opening and the sleeve. Obviously, the sleeve and cylinder assembly will still function even if portions of the coextensive lengths are not in contact through the screw threads. However, certainly more than half of the coextensive length of the sleeve and cylinder openings should be provided with engaging screw threads and preferably up to or exceeding 90% of the coextensive length will have the complementary screw threads.

I claim:

1. A method of joining a sleeve into a cylinder opening of a reciprocating piston apparatus, comprising:
    forming an internal screw in the cylinder opening along a major portion of the length of the opening;

forming a cylindrical sleeve having a relatively thick wall;

forming an external screw thread on the outer diameter of the sleeve along a major portion of its length, said external screw thread being complementary with the internal screw thread of the cylinder opening;

threading the sleeve into a fixture having a central opening with an internal screw thread the same as that of the cylinder opening;

machining a cylinder bore in the sleeve while it is held in the fixture to thereby form a thin wall sleeve;

removing the machined sleeve from the fixture; and threading the machined sleeve into the cylinder opening.

2. A method in accordance with claim 1 together with the step of tightening the sleeve against an axial abutment to take up the backlash in the complementary screw threads.

3. A method in accordance with claim 1 wherein the screw threads are formed along substantially the entire lengths of the sleeve and cylinder opening.

* * * * *